(12) United States Patent
Wood (10) Patent No.: US 8,890,489 B2
(45) Date of Patent: Nov. 18, 2014

(54) CAPACITIVE POWER SUPPLY FOR HANDHELD DEVICE

(75) Inventor: Robert J. Wood, Syracuse, NY (US)

(73) Assignee: Welch Allyn, Inc., Skaneateles Falls, NY (US)

( * ) Notice: Subject to any disclaimer, the term of this patent is extended or adjusted under 35 U.S.C. 154(b) by 559 days.

(21) Appl. No.: 13/102,108

(22) Filed: May 6, 2011

(65) Prior Publication Data

US 2012/0280664 A1    Nov. 8, 2012

(51) Int. Cl.
*H02J 7/00*    (2006.01)
*H02J 7/34*    (2006.01)

(52) U.S. Cl.
CPC .............. *H02J 7/0065* (2013.01); *H02J 7/345* (2013.01)
USPC ............................ 320/166; 320/114; 320/167

(58) Field of Classification Search
CPC ....................................................... H02J 7/345
USPC ........................................................ 320/166
See application file for complete search history.

(56) References Cited

U.S. PATENT DOCUMENTS

| | | | |
|---|---|---|---|
| 4,442,382 A | 4/1984 | Fleck | |
| 4,609,861 A | 9/1986 | Inaniwa et al. | |
| 5,717,311 A | 2/1998 | Im et al. | |
| 6,094,033 A | 7/2000 | Ding et al. | |
| 6,700,352 B1 | 3/2004 | Elliott et al. | |
| 7,323,849 B1 | 1/2008 | Robinett et al. | |
| 8,044,536 B2 * | 10/2011 | Nguyen et al. | 307/82 |
| 2003/0080712 A1 | 5/2003 | Tamura et al. | |
| 2003/0102845 A1 | 6/2003 | Aker et al. | |
| 2004/0251880 A1 | 12/2004 | O'Brien | |
| 2004/0263129 A1 | 12/2004 | Thrap | |
| 2005/0038388 A1 | 2/2005 | Hommann et al. | |
| 2006/0092674 A1 | 5/2006 | Belton et al. | |
| 2007/0255108 A1* | 11/2007 | Schmitz | 600/175 |
| 2007/0273331 A1* | 11/2007 | Cross et al. | 320/115 |
| 2007/0279011 A1* | 12/2007 | Jones et al. | 320/167 |
| 2008/0018308 A1 | 1/2008 | Daboussi | |
| 2008/0111423 A1 | 5/2008 | Baker et al. | |
| 2008/0129219 A1 | 6/2008 | Smith et al. | |
| 2008/0258674 A1 | 10/2008 | Hui et al. | |
| 2008/0259274 A1 | 10/2008 | Chinnock | |
| 2008/0272656 A1 | 11/2008 | Mason | |

(Continued)

FOREIGN PATENT DOCUMENTS

| | | | |
|---|---|---|---|
| EP | 2090256 A2 | 8/2009 | |
| JP | 2000245072 A * | 9/2000 | H02J 7/34 |

(Continued)

OTHER PUBLICATIONS

International Search Report and Written Opinion in PCT/US2012/035764 mailed Oct. 12, 2012, 10 pages.

(Continued)

*Primary Examiner* — Edward Tso
*Assistant Examiner* — Ahmed Omar
(74) *Attorney, Agent, or Firm* — Merchant & Gould P.C.

(57) ABSTRACT

A handheld device includes an electronic instrument and a capacitive power supply for storing and delivering power to the electronic instrument. The capacitive power supply includes at least one capacitor, and an electronic circuit operable to boost a voltage from the capacitor to a higher voltage for use by the electronic instrument. The capacitive power supply can be rapidly recharged.

18 Claims, 7 Drawing Sheets

(56) References Cited

U.S. PATENT DOCUMENTS

| | | | |
|---|---|---|---|
| 2009/0015216 A1 | 1/2009 | Seberger et al. | |
| 2009/0096430 A1* | 4/2009 | Van Der Linde et al. | 320/166 |
| 2009/0179613 A1 | 7/2009 | Masho | |
| 2009/0209990 A1 | 8/2009 | Yates et al. | |
| 2010/0007307 A1 | 1/2010 | Baarman et al. | |
| 2010/0094220 A1 | 4/2010 | Mandro | |
| 2010/0137779 A1 | 6/2010 | Seitz | |
| 2010/0157638 A1 | 6/2010 | Naiknaware et al. | |
| 2010/0182075 A1 | 7/2010 | Yang et al. | |
| 2010/0225283 A1* | 9/2010 | Hsia et al. | 320/167 |
| 2011/0166421 A1* | 7/2011 | Katiraei | 600/200 |

FOREIGN PATENT DOCUMENTS

| | | |
|---|---|---|
| JP | 2008-067323 A | 3/2008 |
| WO | WO 2006/060391 | 6/2006 |
| WO | WO 2008/093170 | 8/2008 |
| WO | 2010029519 A2 | 3/2010 |

OTHER PUBLICATIONS

Dirjish; Ultracapacitors Branch Out Into Wider Markets; Electronic Design, © 2010 Penton Media, Inc.; Nov. 17, 2008; accessed May 4, 2011 via: electronicdesign.com/.../ultracapacitor...; 3 pgs.

Isaacson et al.; Advanced Lithium Ion Battery Charger; Lockheed-Martin Missiles & Space, P.O. Box 3504, Sunnyvale, CA; 94089-3504; © 2000, pp. 193-198.

Park Chulsung et al.; TurboCap: A Batteryless, Supercapacitor-based Power Supply for Mini-FDPM; The University of California; Irvine, CA 92697-2625 USA and National Tsing Hua, Hsinchu, Taiwan; 8 pgs, 2008.

Li et al.; A Wireless Power Interface for Rechargeable Battery Operated Medical Implants; IEEE Transactions on Circuits and Systems II: Express Briefs, vol. 54 Issue 10, Oct. 2007; pp. 912-916.

Simjee et al.; Efficient Charging of Supercapacitors for Extended Lifetime of Wireless Sensor Nodes; IEEE Transactions on Power Electronics, vol. 23 No. 3, May 2008; © 2008 IEEE; pp. 1526-1536.

* cited by examiner

FIG. 5

CAPACITIVE POWER SUPPLY FOR HANDHELD DEVICE

BACKGROUND

Healthcare providers, such as doctors and nurses, frequently use handheld devices when providing healthcare. Many of these handheld devices include electrical devices that must be powered by electricity. One example of such a handheld device is an otoscope, which includes a light to illuminate a patient's ear canal during an examination.

Some handheld instruments include a power cable that can be plugged into a wall receptacle to deliver power to the handheld device. The power cable limits the use of the handheld instrument to locations near a wall receptacle. The power cable is also inconvenient because it can inhibit free movement of the handheld device.

Batteries are sometimes used in handheld devices to overcome the drawbacks of power cables. While batteries do allow the healthcare provider to freely move the device independent of a wall receptacle, batteries have their own limitations. Batteries must be periodically recharged or replaced. Batteries are also slow to recharge, and so the handheld device may be out of service for some time. In addition, batteries have a limited life, and can be harmful to the environment if not disposed of or recycled properly.

SUMMARY

In general terms, this disclosure is directed to a power supply utilizing a capacitor for storing energy. In one possible configuration and by non-limiting example, a super capacitor is provided in a handle of a handheld device to provide power to the device.

One aspect is a handheld medical device including an electronic instrument having a minimum operating voltage, and a capacitive power supply. The capacitive power supply is configured to deliver power to the electronic instrument and includes at least one capacitor and a boost converter circuit. The at least one capacitor is arranged and configured to store energy to power the electronic instrument. The boost regulator circuit is electrically connected to receive power from the capacitor and arranged and configured to boost a voltage from the capacitor to a level greater than or equal to the minimum operating voltage when the voltage from the capacitor falls below the minimum operating voltage.

Another aspect is a power handle including a housing and a capacitive power supply. The housing is sized to be held in a hand and includes an interface arranged and configured to connect the power handle to an electronic instrument. The capacitive power supply is arranged within the housing and configured to deliver power to the electronic instrument. The capacitive power supply includes at least one capacitor, and an electronic circuit operable to boost a voltage from the capacitor to a higher voltage and to deliver power at the higher voltage to the interface to supply power to the electronic instrument.

Yet another aspect is a handheld medical device including a capacitive power supply and a charging circuit. The capacitive power supply includes at least one capacitor that is a primary power storage device for the handheld medical device. The charging circuit is configured to receive power from a charging station and deliver the power to the capacitor, and is operable to charge the capacitor from a fully depleted state to a fully charged state in less than five minutes.

DETAILED DESCRIPTION

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

Figure 1:
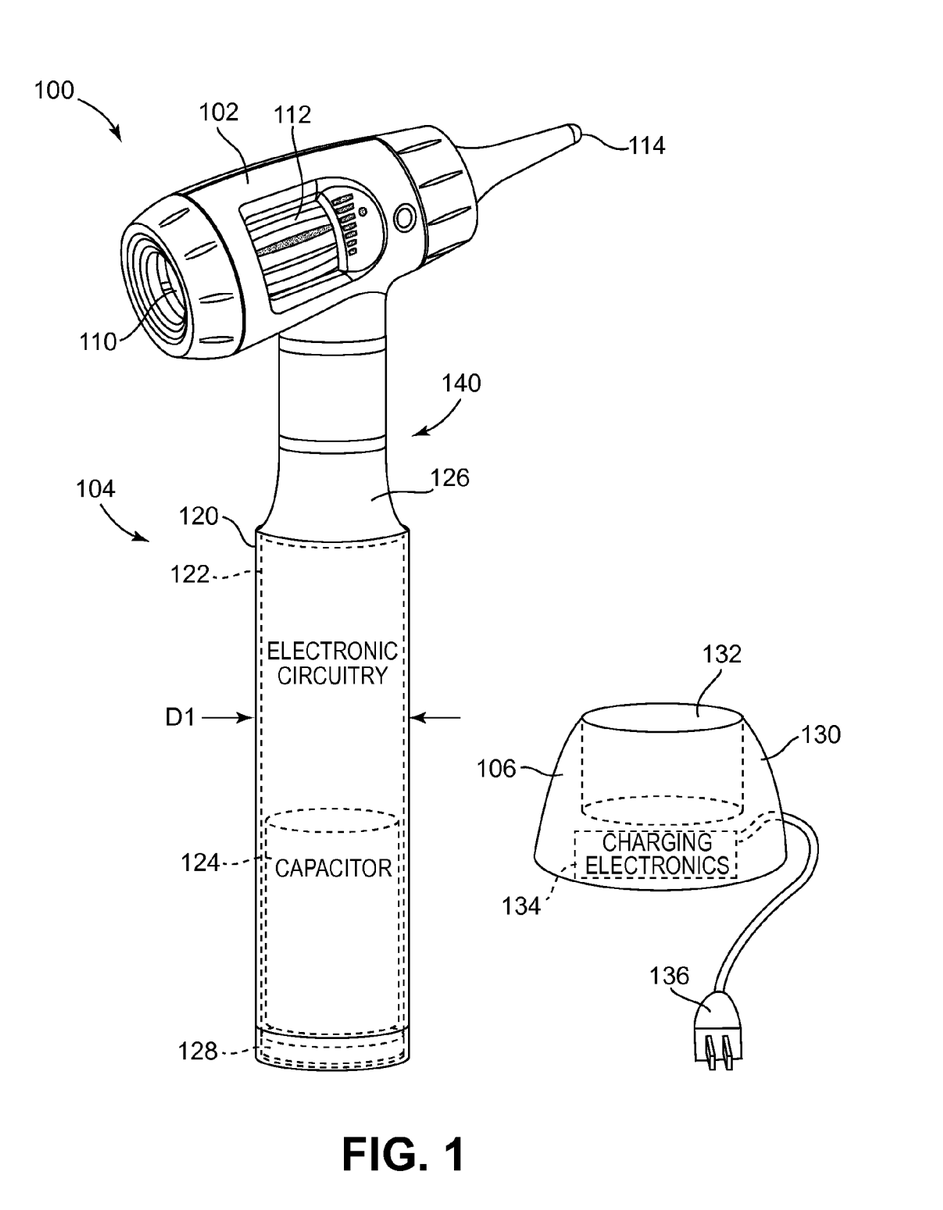
FIG. 1 is a schematic perspective view of an example handheld device.

FIG. 1 is schematic perspective view of an example handheld device 100. In this example, the handheld device 100 includes an instrument 102 and a power handle 104. Some embodiments further include a charging station 106 for recharging the handheld device 100.

An example of instrument 102 is an otoscope, which includes an adjustable optics assembly 110, an adjustment control 112, and a light source 114. An otoscope can be used by a healthcare provider during a patient encounter to view inside a patient's ear canal. To do so, the healthcare provider inserts the end of the otoscope into the ear canal, where it is illuminated by the light source 114. The healthcare provider then looks through the optics assembly 110 and adjusts the focus, if necessary, using the adjustment control 112. As discussed below, the light source is powered by the power handle 104. Power is transferred through conductors within the instrument.

A wide variety of instruments 102 can be used in other embodiments. In some embodiments, the instrument 102 is a medical examination instrument, such as an otoscope, an ophthalmoscope, a thermometer, a sphygmomanometer, a skin surface microscope, a unidirectional occluder, an examination light, an electronic stethoscope, a tympanometric instrument, an audiometer, or a variety of other medical examination instruments. In other embodiments, the instrument 102 is a therapeutic device, such as a surgical instrument, a drug delivery or measurement instrument, or other therapeutic devices. Although exemplary embodiments are described as handheld medical devices, other embodiments are possible, such as non-handheld devices, or non-medical devices.

The power handle 104 forms a handle for the handheld device 100, and is sized to be held in the hand of the healthcare provider. In this example, the power handle 104 includes a housing 120 and electronic circuitry 122 within the housing 120. The electronic circuitry 122 includes, for example, one or more capacitors 124, a variable control 126, and charging circuitry 128.

The housing 120 is, in some embodiments, sized and configured to be held by a hand of a healthcare provider. The housing 120 is typically formed of materials such as metal or plastic, and forms a protective enclosure for the electronic circuitry 122 contained within the housing 120.

In some embodiments, the housing 120 has a cross-sectional dimension D1 sized to fit within a hand of a healthcare provider. In one example, the dimension D1 is in a range from about 0.5 inches to about 4 inches. In another example, the dimension D1 is in a range from about 0.5 inches to about 3 inches. In yet another example, the dimension D1 is about one inch. In some embodiments, dimension D1 is less than about 4 inches, 3 inches, or 2 inches. In some embodiments, at least a portion of the housing has a cylindrical shape, in which case the dimension D1 is the diameter of the housing.

In some embodiments, the housing 120 of the power handle 104 is sealed. Because no batteries are included in some embodiments of the power handle 104, the housing 120 does not require any doors or other openings, other than at the interface 140. A sealed housing 120 reduces the chance of water or other liquid or particle intrusion into the interior of housing 120. A sealed housing 120 is also easier to clean and sanitize.

The electronic circuitry 122 is a capacitive power supply that includes at least one capacitor that stores electrical energy. In some embodiments, the at least one capacitor forms the primary energy storage device of the handheld medical device.

In some embodiments, the capacitor 124 is a super capacitor (sometimes alternatively referred to as an ultra capacitor or a pseudo capacitor), which can store a large amount of electrical energy. In some embodiments, the capacitor includes a high capacitance, a high energy density, and/or a high power density. In some embodiments, the super capacitor has a capacitance of greater than about 100 F. Some embodiments have a power density of greater than 1,000 W/kg. Some embodiments have an energy density in a range from about 1 Wh/kg to about 10 Wh/kg. In some embodiments, the capacitor 124 is an electric double layer capacitor (EDLC).

In some embodiments, the capacitor 124 is an electrochemical capacitor that has a high energy density when compared to common capacitors, typically on the order of thousands of times greater than a high capacity electrolytic capacitor. For example, a typical D-cell sized electrolytic capacitor may have a capacitance in the range of tens of milli-Farads. The same size electric double-layer capacitor may have a capacitance of several farads, an improvement of about two or three orders of magnitude in capacitance, but may have a lower working voltage.

One example of a super capacitor is the pseudo electrochemical double layer capacitor distributed by Ioxus, Inc. of Oneonta, N.Y. These include the 220 F. model (Part No. RHE2R3227SR) having a power density of about 2.65 kW/kg and an energy density of about 6.47 Wh/kg, the 800 F. model (Part No. RHE2R3807SR) having a power density of about 1.82 kW/kg and an energy density of about 6.46 Wh/kg, and the 1000 F. model (Part No. RHE2R3108SR) having a power density of about 1.57 kW/kg and an energy density of about 6.12 Wh/kg. Two or more capacitors are combined to achieve the desired characteristics, in some embodiments.

In some embodiments, the at least one capacitor 124 stores a voltage equal to the maximum rated voltage of two cells in series. As one example, the maximum rated voltage of two cells in series is 4.6 v. Other embodiments utilize other voltages.

A capacitor's voltage decays rapidly over time. As a result, the electronic circuitry 122 includes circuitry in some embodiments that boosts the voltage to a desired level. Examples of the electronic circuitry 122 are described in more detail with reference to FIGS. 2-5.

A variable control 126 is provided in some embodiments to permit adjustment of the amount of power delivered from the power handle 104 to the instrument 102. One possible example of the variable control 126 is a rheostat control (also known as a potentiometer or variable resistor) that can be operated by the healthcare provider to adjust the amount of power delivered to the instrument 102, such as to increase or decrease the intensity of the light source 114.

Another possible example of the variable control 126 is a capacitive sensing variable control. An example of a capacitive sensing variable control is described in co-pending U.S. patent application Ser. No. 13/102,119, by Robert J. Wood, filed on even date, and titled VARIABLE CONTROL FOR HANDHELD DEVICE, the disclosure of which is incorporated by reference herein in its entirety.

Some embodiments do not include a variable control, but rather include an on/off control. In yet another embodiment, an on/off control or variable control is part of the instrument 102, rather than being a part of the handle 104.

The charging circuitry 128 is included in some embodiments to receive power from the charging station 106 and to deliver the power to the capacitor 124. The charging circuitry can include, for example, a coil for receiving power through magnetic fields generated by a corresponding coil of the charging station 106. The coils are placed into close proximity to one another such that inductive coupling occurs between the coils.

In another embodiment, a direct electrical connection is made between electrical contacts accessible through the housing 120 (such as through a plug or port) and the charging station 106 for providing power to the power handle.

Additional charging circuitry 128 can be included, such as a fuse, filtering electronics, and other charging electronics (such as regulators, inductors, capacitors, etc.) can be used to control or filter power delivery to the capacitor 124.

The charging station 106 is provided to transfer power from a power source, such as a wall receptacle, to the handheld device 100. The charging station 106 includes a housing 130, such as made of plastic, including a receptacle 132 for receiving the handheld device 100 when not in use.

The housing 130 also forms a protective enclosure for charging electronics 134. The charging electronics 134 receive power from a wall receptacle or other power source, through the power cable 136, and converts the power into a form that can be transferred to the handheld device 100. For example, the charging electronics 134 can include an alternating current ("AC") to direct current ("DC") converter for converting the AC from the wall receptacle to a lower voltage DC signal.

In some embodiments the charging electronics include electrical contacts that are shaped to make a direct electrical connection with electrical contacts on the power handle 104 for direct power transfer. In another possible embodiment, the charging electronics 134 include a coil for inductively transferring power to the power handle 104. In some embodiments, the charging electronics 134 includes a constant wattage circuit, which provides energy at a rate equal to the maximum available DC power. As an example, the maximum available DC power is in a range from about 1 W to about 100 W. In another embodiment, the maximum available DC power is about 60 W. Other embodiments have other maximum available DC power values.

In some embodiments the instrument 102 is connected to the power handle 104 at an interface 140. The interface typically includes a mechanical interface, such as mating screw threads, or a snap together connection, and also an electrical interface to transfer power from the power handle 104 into the instrument 102. In some embodiments the instrument 102 can be disconnected from the power handle 104 at the interface. A common interface 140 design can be used in a variety of different types of instruments, to permit a single configuration of power handle 104 to be used with multiple different types of instruments. In other possible embodiments, however, instrument 102 is a single unit that includes the components of the power handle 104 within the housing of instrument 102, rather than within a separate power handle.

Figure 2:
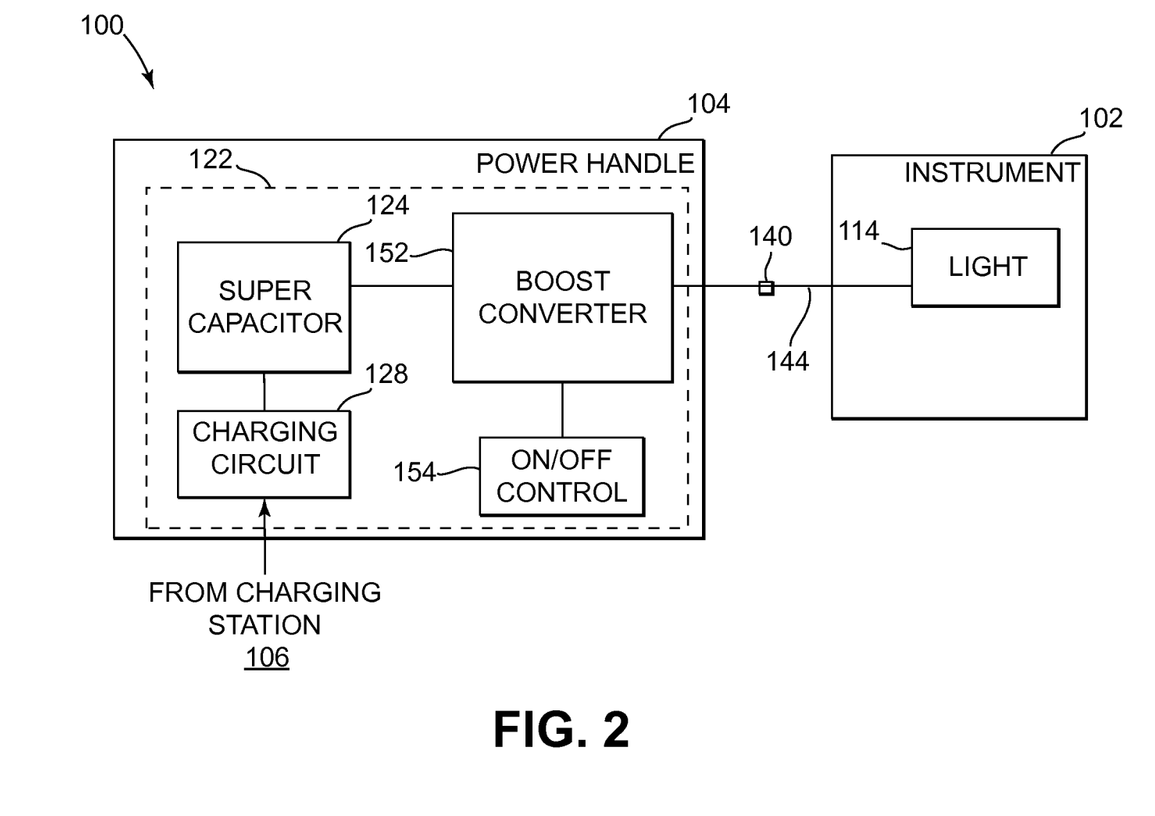
FIG. 2 is an electrical block diagram of the example handheld device, including an instrument and a power handle.

FIG. 2 is an electrical block diagram illustrating an example of the handheld device 100. As shown in FIG. 1, the example handheld device 100 includes an instrument 102 and a power handle 104. In this example, the electronic circuitry provides a substantially constant power and/or substantially constant output voltage to the instrument 102 during operation.

In some embodiments, the instrument 102 is an electronic instrument including one or more electronic devices requiring electrical power, such as a light 114. Examples of the light 114 include a halogen bulb and a light emitting diode. Other embodiments include other electronic devices or combinations of electronic devices within the instrument 102. The instrument 102 receives power from the power handle 104 through one or more conductors 144. The conductors 144 pass electrical power through the interface 140 between the power handle 104 and the instrument 102.

The one or more electronic devices of the instrument 102, such as the light 114, require a certain amount of power in order to function in their intended manner. For example, if the voltage supplied to the electronic devices falls below a minimum operating voltage, the electronic devices will no longer function in their intended manner. An example of a minimum operating voltage is 3.5 v for a 3.5 v halogen bulb. Other embodiments have other minimum operating voltages.

In some embodiments, the minimum operating voltage is the minimum voltage required to power the electronic instrument for effective use by a healthcare provider during a patient encounter. Accordingly, the electronic circuitry 122 operates to maintain the voltage at or above the minimum operating voltage, as described in more detail herein. The power handle 104 includes the electronic circuitry 122. In this example, the electronic circuitry 122 includes a capacitor 124, charging circuitry 128, boost converter 152, and on/off control 154.

The length of time that the instrument 102 can be powered by a single charge on capacitor 124 is a function of the power drawn by instrument 102 and the capacity of the capacitor 124. As an example, a capacitor 124 having a capacity of 3,000 Ws can supply 3 W of power to the instrument 102 including a 3 W halogen bulb for about 15 minutes. The same capacitor can supply 1 W of power to an instrument 102 including a 1 W LED bulb for about 50 minutes. As another example, a capacitor 124 having a capacity of 1800 Ws can supply 3 W of power for 10 minutes, and 1 W of power for 30 minutes.

The charging circuitry 128 operates to charge the capacitor 124 when the power handle is placed into the charging station 106 and the charging station 106 is connected to a power source. The power is converted to a form suitable for delivery to the capacitor, which can be charged very rapidly. For example, some embodiments can charge the capacitor 124 from a fully depleted state to a fully charged state in less than one minute.

The charge time is a factor of the power capacity of the capacitor 124 and the rate of power delivery from the charging station 106 to the charging circuitry 128 and into the capacitor 124. As one example, the capacitor 124 has a power capacity of 3,000 Ws, and the charging circuitry 128 can deliver 60 W of power to the capacitor 124. In this example, the capacitor 124 can be charged in 50 seconds. As another example, the capacitor 124 has a power capacity of 1,800 Ws, and the charging circuitry 128 can deliver 60 W of power to the capacitor 124. In this example, the capacitor 124 can be charged in approximately 30 seconds. As a result, even if the handheld device 100 is not put back into the charging station 106 until the capacitor 124 is fully depleted, the handheld device 100 can be fully charged in less than one minute, or charged to a functional state in even less time.

During normal operation, the output of the capacitor 124 has a voltage that decreases rapidly from the initial voltage. Most electronic devices utilized in the instrument 102, such as the light 114, require at least a minimum operating voltage that may not be directly provided by the capacitor 124 after a period of time. If the voltage falls below the minimum operating voltage, the electronic device may cease to operate.

The boost converter 152 is provided to boost the voltage from the capacitor 124 to a desired level so that the electronic devices in the instrument 102 can continue to operate even after the voltage from the capacitor 124 has decreased below the minimum operating voltage. In this example, the boost converter 152 provides a constant voltage output, despite the decreasing voltage from the capacitor 124. An example of the constant voltage output is 3.6 v to power a 3.5 v halogen bulb. Other embodiments provide other voltage outputs.

In some embodiments, the boost converter 152 is an out bound buck-boost circuit that delivers a regulated output voltage until the voltage on the at least one capacitor has dropped to the minimum voltage that the specific electro-chemical construction allows. As one example, some embodiments continue to supply the regulated output voltage until the voltage on the at least one capacitor 124 has dropped to approximately 0.5 v.

In this example, an on/off control 154 is provided (instead of the variable control 126 shown in FIG. 1) to turn on or off the power handle 104. When the on/off control 154 is in an off position, the power handle 104 does not deliver power to the instrument 102. When in the on position, the power handle 104 delivers power to the instrument 102, so long as adequate power remains in the capacitor 124.

Figure 3:
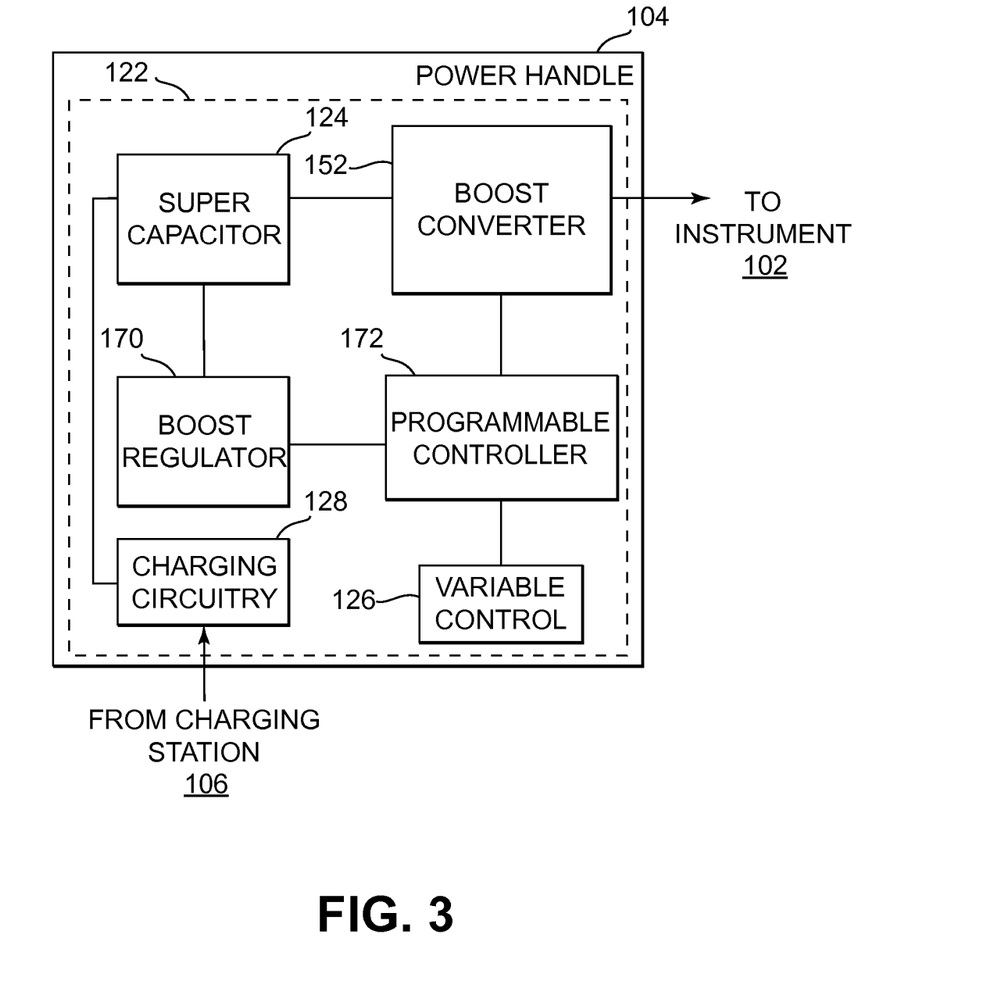
FIG. 3 is an electrical block diagram illustrating another example of the power handle shown in FIG. 2.

FIG. 3 is an electrical block diagram illustrating another example of the power handle 104. In this example, the power handle 104 includes electronic circuitry 122 including a capacitor 124, a variable control 126, charging circuitry 128, a boost converter 152, a boost regulator 170, and a programmable controller 172. In this example, the power handle 104 provides a user variable power and/or a user variable output voltage to instrument 102 during operation, such as to permit the intensity of the light 114 (shown in FIG. 1) to be adjusted.

In this example, the capacitor 124, charging circuitry 128, and boost converter 152 all operate as described with reference to FIG. 2, except that the boost converter 152 is configured to receive an input from the programmable controller 172, and to adjust the output voltage accordingly.

The variable control 126 receives input from the healthcare provider, such as to turn the power handle 104 on and off. The variable control 126 also receives inputs from the user that indicate a desire for the power to the instrument 102 to be increased or decreased. The input from variable control is provided to the programmable controller 172.

The boost regulator 170 receives power from the capacitor 124 and modifies the power into a form required by the programmable controller 172, such as having a substantially constant fixed voltage. This power is then supplied to the programmable controller 172 to support the proper operation of the programmable controller 172.

The programmable controller 172 operates as an intelligent controller for the power handle 104. In some embodiments, data instructions are stored in a memory device, which may be a part of the programmable controller 172 (e.g., on-board memory) or a separate memory device that is readable by the programmable controller 12. The data instructions are executed by the programmable controller 172 to perform operations defined by the data instructions.

Figure 5:
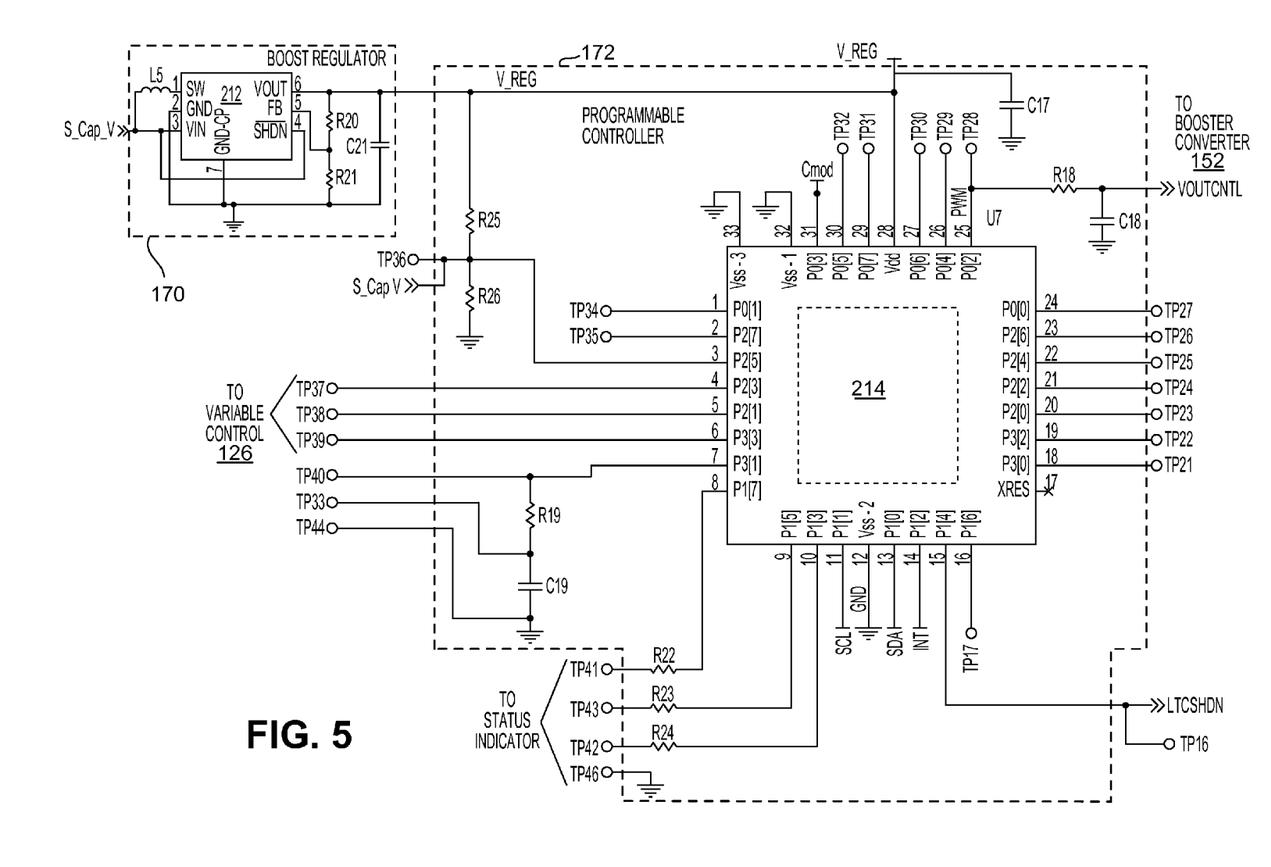
FIG. 5 is an electrical schematic of an example boost regulator and a programmable controller of the example power handle shown in FIG. 3.

One example of the programmable controller 172 is shown in FIG. 5, which includes a processing device. Examples of processing devices include microprocessors, central processing units, microcontrollers, programmable logic devices, field programmable gate arrays, digital signal processing devices, and the like. Processing devices may be of any general variety such as reduced instruction set computing devices, complex instruction set computing devices, or specially designed processing devices such as an application-specific integrated circuit device.

The programmable controller 172 receives user input from the variable control 126, and operates in conjunction with the boost converter 152 to generate a user variable output to the instrument 102. The boost converter 152 compensates for the decreasing voltage of the capacitor over time, while the programmable controller 172 provides inputs to the boost converter 152 to adjust the output power to the level desired by the healthcare provider.

Figure 4:
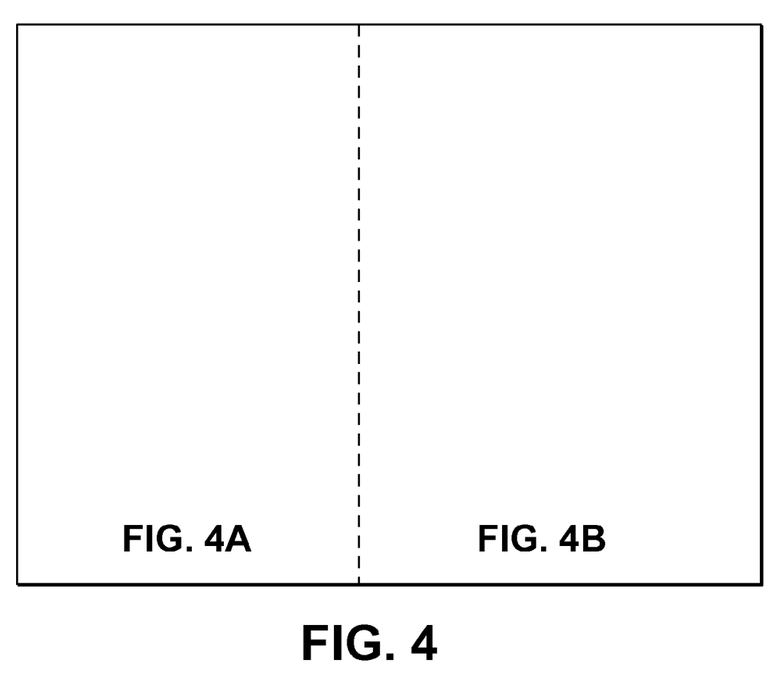
FIG. 4 illustrates the arrangement of FIGS. 4A and 4B.

FIGS. 4-5 illustrate a more detailed example of the power handle 104 shown in FIG. 3.

FIG. 4 (including FIGS. 4A and 4B) is an electrical schematic of an example boost converter 152 of the electronic circuitry 122 shown in FIG. 3. The boost converter 152 includes an integrated circuit 202, circuit points TP1 to TP12, inductors L1-L4, Schottky diodes D1 to D4, capacitors C1 to C16, resistors R1 to R15, and a metal oxide semiconductor field effect transistor (MOSFET) Q1.

Figure 4A:
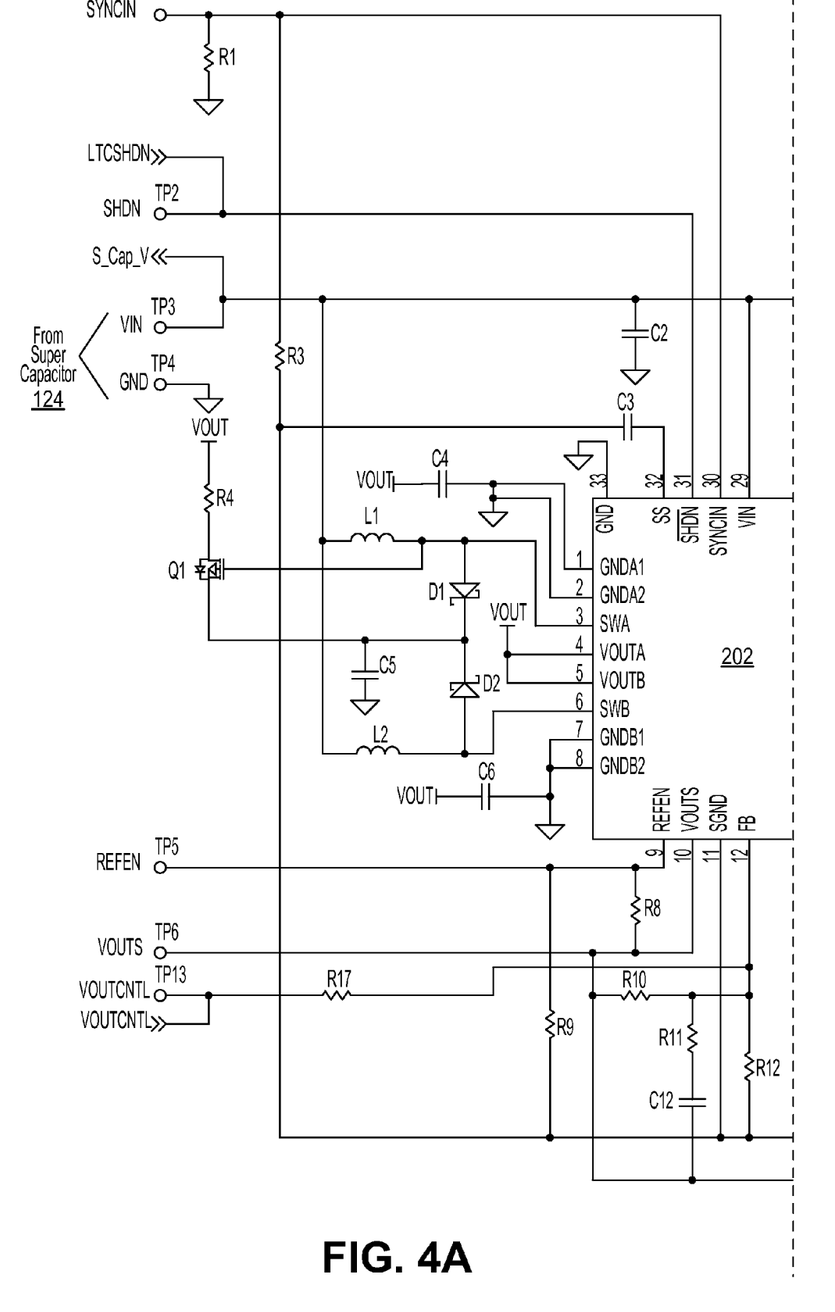
FIG. 4A is a first portion of an electrical schematic of an example boost converter of the example power handle shown in FIG. 3.
Figure 4B:
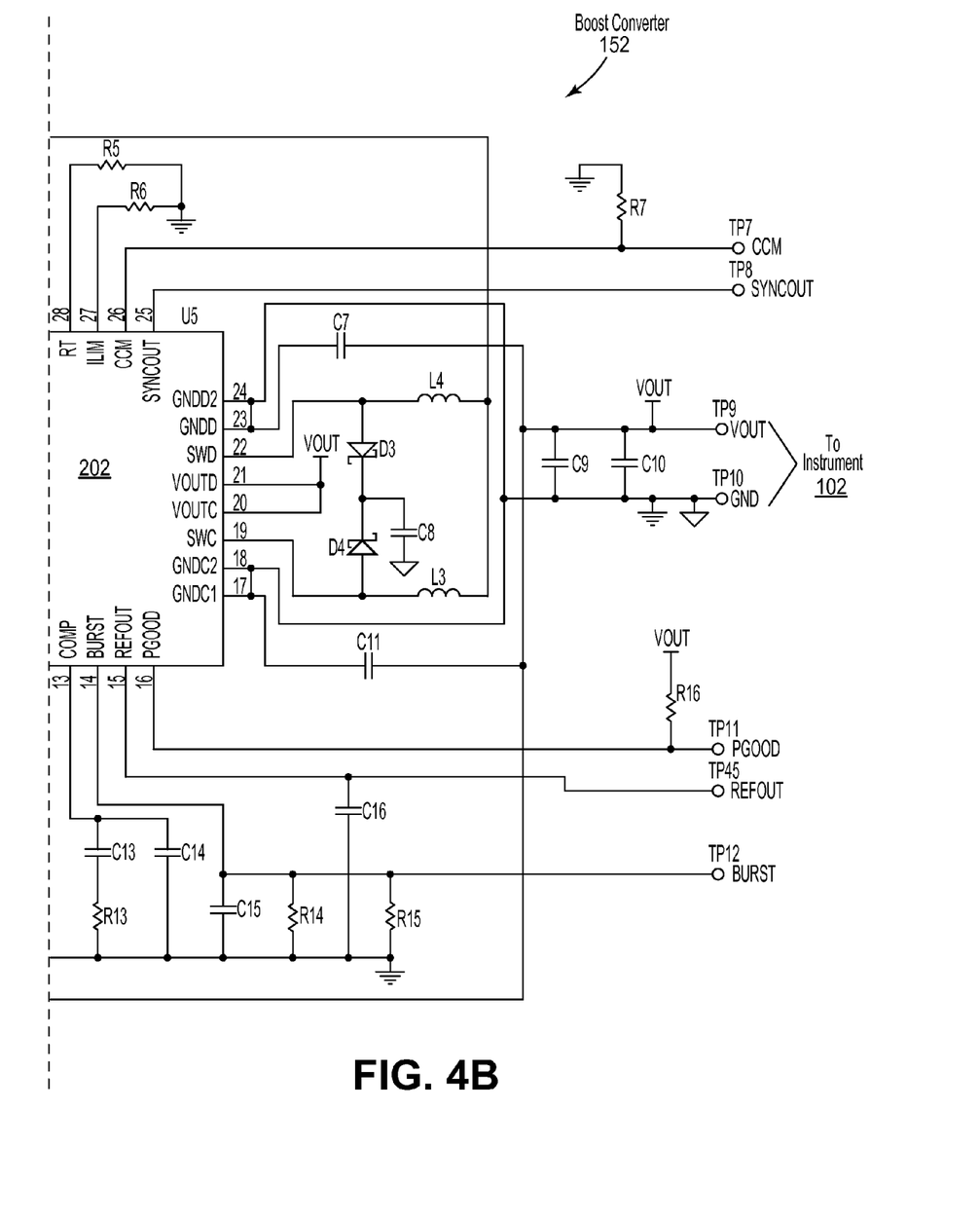
FIG. 4B is a second portion of the electrical schematic shown in FIG. 4A.

The integrated circuit 202 is, for example, a 4-phase synchronous step-up DC/DC converter, such as Part No. LTC3425 distributed by Linear Technology Corporation of Milpitas, Calif. Other converters are used in other embodiments.

Power is received from the capacitor 124 at circuit point TP3, which is supplied to inductors L1, L2, L3, and L4, through Schottky diodes D1, D2, D3, and D4, and output by MOSFET Q1. The integrated circuit 202 detects the voltage being supplied by the capacitor and controls the switching of the circuit such that the voltage is increased across the inductors L1, L2, L3, and L4 to the desired level.

In this example, the boost converter 152 is also configured to receive an input from the programmable controller 172, shown in FIG. 5, to provide a user variable output voltage. The input is received by the boost converter 152 at the circuit point TP13 and is labeled as VOUTCNTL.

The output of the circuit at circuit point TP9, which is labeled as VOUT, is then provided to instrument 102.

FIG. 5 is an electrical schematic of an example circuit including a boost regulator 170 and a programmable controller 172. In this example, the boost regulator 170 includes an integrated circuit 212, an inductor L5, resistors R20 and R21, and a capacitor C21. The example programmable controller 172 includes a processing device 214, circuit points TP16 to TP46, resistors R18 to R26, and capacitors C17 and C18.

The integrated circuit 212 is, for example, a synchronous step-up dc/dc converter, such as Part No. LTC3526LB distributed by Linear Technology Corporation. The boost regulator 170 is coupled to the capacitor 124 at the circuit point labeled as S_CAP_V, and operates to generate a substantially constant fixed voltage output (labeled as VREG) as needed to operate the programmable controller 172.

The programmable controller 172 includes a processing device 214. An example of the processing device 214 is a programmable system-on-chip, such as Part No. CY8C21434 distributed by Cypress Semiconductor Corporation of San Jose, Calif. The programmable system-on-chip includes a CPU and memory devices. The memory devices include static random access memory (SRAM), static read only memory (SROM), flash memory. The programmable controller 172 can also include a variety of other devices, such as clocks, input/output interfaces, digital and analog electronics, etc.

The programmable controller 172 receives inputs from the variable control 126 at circuit points TP37, TP38, and TP39, and generates an appropriate output signal that is provided to the boost converter 152, at the circuit point labeled as VOUTCNTL.

In this example, the power handle 104 includes a status indicator, such as a light emitting diode (LED) indicator. The status indicator is operable to illuminate with a specific color indicative of a status of the power handle. In one example, the status indicator is a single indicator having three integral LEDs, including a red LED, a green LED, and a blue LED. The LEDs are operated by the programmable controller 172 to indicate the status. For example, a yellow status light indicates that the power handle 104 is in need of charging, a blue status light indicates that the power handle is charging, and a green status light indicates that the power handle 104 is fully charged.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

What is claimed is:

1. A device comprising:
    an electronic instrument having a minimum operating voltage; and
    a capacitive power supply configured to deliver power to the electronic instrument, the capacitive power supply comprising:
        at least one capacitor arranged and configured to store energy to power the electronic instrument;
        a boost converter circuit electrically connected to receive power from the capacitor and arranged and configured to boost a voltage from the capacitor to a variable voltage level output greater than or equal to the minimum operating voltage when the voltage from the capacitor falls below the minimum operating voltage;
        a boost regulator coupled to receive power from the at least one capacitor and operable to generate a substantially constant fixed voltage;
        a variable control configured to receive input from a user; and
        a programmable controller powered by the substantially constant fixed voltage and programmed to adjust the variable voltage level output from the boost converter based on the input received from the user.

2. The device of claim 1, wherein the device is a handheld medical device, and wherein at least one capacitor is a primary energy storage device of the handheld medical device.

3. The device of claim 1, wherein the capacitive power supply is battery-free.

4. The device of claim 1, wherein the electronic instrument includes a light source selected from a bulb and a light emitting diode.

5. The device of claim 1, wherein the at least one capacitor has a capacitance of greater than 100 F, a power density of greater than 1,000 W/kg, and an energy density in a range from about 1 Wh/kg to about 10 Wh/kg.

6. The device of claim 1, wherein the minimum operating voltage is the minimum voltage required to power the electronic instrument for effective use by a healthcare provider during a patient encounter.

7. The device of claim 1, wherein the device is a handheld medical device.

8. A power handle comprising:
a housing sized to be held in a hand, the housing including an interface arranged and configured to connect the power handle to an otoscope including a light generator, the interface including a mechanical interface and an electrical interface, the mechanical interface detachably connecting the housing to the otoscope, and the electrical interface configured to electrically connect the power handle to the light generator of the otoscope to provide power to the light; and
a capacitive power supply arranged within the housing and configured to deliver power to the electronic instrument, the capacitive power supply comprising:
a primary power storage device comprising a capacitor;
a boost converter operable to boost a voltage from the capacitor to a higher variable voltage and to deliver power at the higher variable voltage to the interface to supply power to the electronic instrument;
a boost regulator coupled to receive power from the capacitor and operable to generate a substantially constant fixed voltage;
a variable control configured to receive input from a user; and
a programmable controller powered by the substantially constant fixed voltage and programmed to adjust the higher variable voltage output from the boost converter based on the input received from the user.

9. The power handle of claim 8, wherein the mechanical interface comprises screw threads.

10. The power handle of claim 8, wherein the variable control is a rheostat.

11. The power handle of claim 8, wherein the housing has a cross-sectional dimension of less than about 3 inches.

12. The power handle of claim 8, further comprising an inductive charging circuit including at least one coil, the coil shaped and positioned to receive power from an external charging station, and the inductive charging circuit including electronics to deliver the power to the at least one capacitor to recharge the at least one capacitor.

13. The power handle of claim 8, wherein the housing is sealed except at the interface.

14. A handheld medical device comprising:
a capacitive power supply comprising:
at least one capacitor that is a primary power storage device for the handheld medical device;
a boost converter circuit electrically connected to receive power from the at least one capacitor and arranged and configured to boost a voltage from the at least one capacitor to a variable voltage;
a boost regulator coupled to receive power from the at least one capacitor and operable to generate a substantially constant fixed voltage;
a variable control configured to receive input from a user; and
a programmable controller powered by the substantially constant fixed voltage and programmed to adjust the variable voltage level output from the boost converter circuit based on the input received from the user; and
a charging circuit configured to receive power from a charging station and deliver the power to the capacitor, wherein the charging circuit is operable to charge the capacitor from a depleted state to a charged state in less than five minutes.

15. The handheld medical device of claim 14, wherein the charging circuit is operable to charge the capacitor from the depleted state to the charged state in less than one minute.

16. The handheld medical device of claim 14, wherein the charging circuit includes electrical contacts to directly receive power from the charging station.

17. The handheld medical device of claim 16, wherein the charging circuit includes a coil for inductive transfer of power from the charging station.

18. The handheld medical device of claim 14, further comprising a status indicator visually indicating a charge status of the capacitor.

* * * * *